United States Patent
Liu et al.

(10) Patent No.: US 10,295,699 B2
(45) Date of Patent: May 21, 2019

(54) MARINE MAGNETISM DETECTION METHOD AND DEVICE

(71) Applicants: National Deep Sea Center, Qingdao, Shandong (CN); The First Institute of Oceanography, SOA, Qingdao, Shandong (CN)

(72) Inventors: Baohua Liu, Shandong (CN); Yanliang Pei, Shandong (CN); Kaiben Yu, Shandong (CN); Chenguang Liu, Shandong (CN); Guangming Kan, Shandong (CN); Zhiguo Yang, Shandong (CN)

(73) Assignees: National Deep Sea Center, Shandong (CN); The First Institute of Oceanography, SOA, Shandong (CN)

( * ) Notice: Subject to any disclaimer, the term of this patent is extended or adjusted under 35 U.S.C. 154(b) by 40 days.

(21) Appl. No.: 15/575,640

(22) PCT Filed: Nov. 2, 2016

(86) PCT No.: PCT/CN2016/104308
§ 371 (c)(1),
(2) Date: Nov. 20, 2017

(87) PCT Pub. No.: WO2018/058736
PCT Pub. Date: Apr. 5, 2018

(65) Prior Publication Data
US 2018/0292564 A1    Oct. 11, 2018

(30) Foreign Application Priority Data
Sep. 27, 2016    (CN) .......................... 2016 1 0852673

(51) Int. Cl.
*G01V 3/40*    (2006.01)
*G08C 19/00*    (2006.01)
(Continued)

(52) U.S. Cl.
CPC .................. *G01V 3/40* (2013.01); *G01V 3/16* (2013.01); *G08C 19/00* (2013.01); *G08C 17/02* (2013.01)

(58) Field of Classification Search
CPC . G01V 3/40; G01V 3/16; G08C 19/00; G08C 17/02
(Continued)

(56) References Cited

U.S. PATENT DOCUMENTS 4,402,479 A    9/1983  Phipps, III et al.
6,009,421 A *  12/1999 Xie .......................... G06F 11/25
                                                                706/61
(Continued)

FOREIGN PATENT DOCUMENTS

CN        2437378 Y      7/2001
CN     103180206 A      6/2013
(Continued)

OTHER PUBLICATIONS

International Searching Authority, Search Report issued in International Application No. PCT/CN2016/104308 dated Nov. 2, 2016 (6 pages).

*Primary Examiner* — Giovanni Astacio-Oquendo
(74) *Attorney, Agent, or Firm* — Wood Herron & Evans LLP

(57) ABSTRACT

A marine magnetism detection device and a detection method are provided. The device includes a surveying ship, an onboard laboratory magnetism measurement portion arranged on the surveying ship, an aerostat shell and an aerostat magnetism measurement portion arranged inside the aerostat shell. The aerostat shell is connected to the surveying ship via a rope, and the aerostat shell floats in air. The aerostat magnetism measurement portion includes a magnetic sensor, an electronic magnetism data acquisition unit and an aerostat transmission unit; and the onboard
(Continued)

laboratory magnetism measurement portion includes a data recording computer and a laboratory transmission unit. The marine magnetism detection device and method of the present invention are advantageously not limited by the working sea area and can also operate with other onboard devices and dragging devices.

13 Claims, 3 Drawing Sheets

(51) Int. Cl.
*G01V 3/16* (2006.01)
*G08C 17/02* (2006.01)

(58) Field of Classification Search
USPC ........................................ 324/331, 330, 323
See application file for complete search history.

(56) References Cited

U.S. PATENT DOCUMENTS

| 6,507,832 | B1 * | 1/2003 | Evans | G06N 5/025 |
| | | | | 706/61 |
| 2010/0282276 | A1 * | 11/2010 | Kueper | B24B 7/06 |
| | | | | 134/6 |
| 2010/0288872 | A1 | 11/2010 | Wiley | |

FOREIGN PATENT DOCUMENTS

| CN | 103786883 A | 5/2014 |
| CN | 103926627 A | 7/2014 |
| CN | 104808250 A | 7/2015 |
| RU | 2006889 C1 | 1/1994 |

* cited by examiner

MARINE MAGNETISM DETECTION METHOD AND DEVICE

CROSS-REFERENCE TO RELATED APPLICATIONS

This application is a national phase of PCT/CN2016/104308, filed on Nov. 2, 2016, which claims priority to Chinese Application No. 201610852673.9, which was filed Sep. 27, 2016. These prior applications are incorporated herein by reference, in their entireties.

TECHNICAL FIELD

The present invention relates to the technical field of geophysical exploration and, in particular, to a method and device configured for measuring a geomagnetic field.

BACKGROUND

Magnetic fields around the earth are called geomagnetic fields. The measurement of marine geomagnetic fields is generally a process of geomagnetic measurement by sailing a ship carried with a magnetometer on the sea. At present, many measurements of marine magnetic fields are performed by dragging only. A magnetic probe is dragged in the seawater after a surveying ship, and the cable for dragging has a length which is three times greater than the length of the ship. This operating mode will be limited in some sea areas, for example, an inshore cultivation area, a polar area with floating ice, etc., in which case the magnetic probe will be damaged or even get lost.

SUMMARY

An objective of the present invention is to provide a marine magnetism detection device and method which will not be limited by the working sea area and can also operate with other onboard devices and dragging devices, in order to overcome the deficiencies in the prior art.

For this purpose, in one embodiment, the present invention provides the following solutions. A marine magnetism detection device is provided, including a surveying ship, an onboard laboratory magnetism measurement portion arranged on the surveying ship, an aerostat shell and an aerostat magnetism measurement portion arranged inside the aerostat shell, wherein the aerostat shell is connected to the surveying ship via a rope, and the aerostat shell floats in air; the aerostat magnetism measurement portion includes a magnetic sensor, an electronic magnetism data acquisition unit and an aerostat transmission unit; the onboard laboratory magnetism measurement portion includes a data recording computer and a laboratory transmission unit; the magnetic sensor acquires marine magnetism and transmits a marine magnetism signal to the electronic magnetism data acquisition unit; the electronic magnetism data acquisition unit converts the marine magnetism signal into a digital signal and then transmits the digital signal to the aerostat transmission unit; the aerostat transmission unit transmits the digital signal to the laboratory transmission unit over a wireless or wired network and transmits a command, which is transmitted by the laboratory transmission unit and issued by the data recording computer, to the electronic magnetism data acquisition unit; and, the laboratory transmission unit transmits the digital signal to the data recording computer and transmits a command issued by the data recording computer to the aerostat transmission unit over a wired or wireless network.

In the marine magnetism detection device of the present invention, the magnetic sensor is a total-field magnetic sensor.

In the marine magnetism detection device of the present invention, the magnetic sensor is a vector-type magnetic sensor; the aerostat magnetism measurement portion further comprises a heading and attitude reference system; and, the heading and attitude reference system is configured to measure the heading, roll angle and pitch angle parameters of the aerostat shell and transmit the measured parameters to the electronic magnetism data acquisition unit.

In the marine magnetism detection device of the present invention, the rope is made of aramid fiber material.

In the marine magnetism detection device of the present invention, the data transmission between the laboratory transmission unit and the aerostat transmission unit is realized by a cable or an optical fiber, and the cable or optical fiber is enveloped inside the rope.

In the marine magnetism detection device of the present invention, the data transmission between the laboratory transmission unit and the aerostat transmission unit is realized via Wi-Fi.

In the marine magnetism detection device of the present invention, a power supply module is provided within the aerostat shell, and the power supply module provides power to the aerostat magnetism measurement portion.

In the marine magnetism detection device of the present invention, the aerostat magnetism measurement portion further includes peripheral sensors; the peripheral sensors include cameras and/or altitude meters and/or temperature sensors and/or inclination sensors; and, the peripheral sensors are each connected to the electronic magnetism data acquisition unit.

In the marine magnetism detection device of the present invention, the aerostat magnetism measurement portion further includes an aerostat GPS connected to the electronic magnetism data acquisition unit.

In the marine magnetism detection device of the present invention, an onboard GPS is connected to the surveying ship.

The present invention, in one embodiment, provides a marine magnetism detection method, including the following steps:
(1) connecting all portions of the marine magnetism detection device to ensure the portions operate normally;
(2) allowing the surveying ship to travel at a low speed, and releasing the aerostat shell so that the aerostat shell floats in air;
(3) testing the marine magnetism detection device to ensure all portions operate normally; and
(4) allowing the surveying ship to travel at a normal speed; acquiring, by the magnetic sensor and in the travelling process, marine magnetism and transmitting a marine magnetism signal to the electronic magnetism data acquisition unit; converting, by the electronic magnetism data acquisition unit, the marine magnetism signal into a digital signal and transmitting the digital signal to the aerostat transmission unit; transmitting, by the aerostat transmission unit, the digital signal to the laboratory transmission unit over a wireless or wired network, and transmitting a command, which is transmitted by the laboratory transmission unit and issued by the data recording computer, to the electronic magnetism data acquisition unit; transmitting, by the laboratory transmission unit, the digital signal to the data recording computer, and transmitting a command issued by the data recording computer to the aerostat transmission unit over a wired or wireless network; and, receiving, by the data recording computer, the data transmitted from the electronic magnetism data acquisition unit, and recording, processing and monitoring the data to obtain marine magnetism data.

In the marine magnetism detection method of the present invention, the distance from the surveying ship to the aerostat shell is not less than the length of the ship body of the surveying ship.

In the marine magnetism detection method, the electronic magnetism data acquisition unit synchronously acquires magnetism data and attitude data acquired by the heading and attitude reference system; and the electronic magnetism data acquisition unit synchronously transmits the magnetism data and the attitude data to the aerostat transmission unit.

Compared with known designs, the present invention has the following technical effects: since the marine magnetism detection device of the present invention includes a surveying ship, an onboard laboratory magnetism measurement portion arranged on the surveying ship, an aerostat shell and an aerostat magnetism measurement portion arranged inside the aerostat shell, with the aerostat shell being connected to the surveying ship via a rope and the aerostat shell floating in air, the device of the present invention employs a floating drag operation, so that the device will not be hindered and limited by barriers on the sea surface and will be thus applicable to operations in areas having barriers on the sear surface, such as a polar area with floating ice, an inshore cultivation area, etc.; moreover, since the aerostat shell floats in air, the floating-type marine magnetism detection device of the present invention can also operate with other onboard devices such as a marine gravitometer or a multi-beam depth finder, and can also operate with other dragging devices such as a single-cable two-dimensional earthquake measurement system or a multi-cable three-dimensional earthquake measurement system.

BRIEF DESCRIPTION OF THE DRAWINGS

Various additional features and advantages of the invention will become more apparent to those of ordinary skill in the art upon review of the following detailed description of one or more illustrative embodiments taken in conjunction with the accompanying drawings. The accompanying drawings, which are incorporated in and constitute a part of this specification, illustrate one or more embodiments of the invention and, together with the general description given above and the detailed description given below, explain the one or more embodiments of the invention.

DETAILED DESCRIPTION

Figure 1:
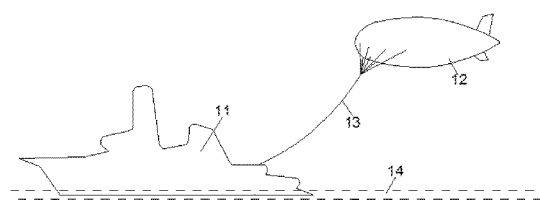
FIG. 1 is a schematic overall structure diagram of a marine magnetism detection device, according to various embodiments of the present invention.

As shown in FIG. 1, the present invention provides a marine magnetism detection device, including a surveying ship 11, an onboard laboratory magnetism measurement portion arranged on the surveying ship 11, an aerostat shell 12 and an aerostat magnetism measurement portion arranged inside the aerostat shell 12. The aerostat shell 12 is connected to the surveying ship 11 via a rope 13 made of aramid fiber material such as KEVLAR®, and the aerostat shell 12 floats in air above the sea surface 14.

Figure 2:
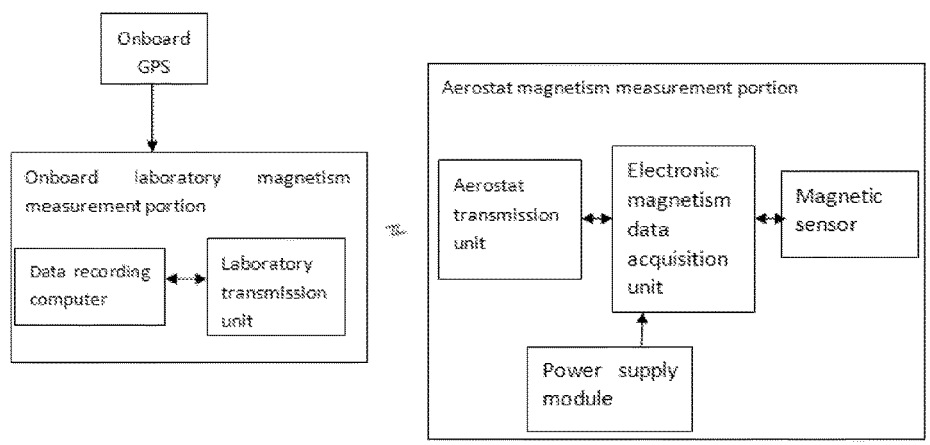
FIG. 2 is a modular schematic block diagram of an Embodiment 1 of the marine magnetism detection device consistent with FIG. 1.

As shown in FIG. 2, in Embodiment 1, the aerostat magnetism measurement portion includes a magnetic sensor, an electronic magnetism data acquisition unit, an aerostat transmission unit and a power supply module. The power supply module provides power to the aerostat magnetism measurement portion. The magnetic sensor is a single total-field magnetic sensor. The onboard laboratory magnetism measurement portion includes a data recording computer and a laboratory transmission unit. The magnetic sensor acquires marine magnetism and transmits a marine magnetism signal to the electronic magnetism data acquisition unit. The electronic magnetism data acquisition unit converts the marine magnetism signal into a digital signal and then transmits the digital signal to the aerostat transmission unit. The aerostat transmission unit transmits the digital signal to the laboratory transmission unit over a wireless or wired network and transmits a command, which is transmitted by the laboratory transmission unit and issued by the data recording computer, to the electronic magnetism data acquisition unit. The laboratory transmission unit transmits the digital signal to the data recording computer and transmits a command issued by the data recording computer to the aerostat transmission unit over a wired or wireless Wi-Fi network.

The present invention, in this and other embodiments, provides a marine magnetism detection method, including the following steps:
(1) connecting the aerostat magnetism measurement portion to a battery, as the power supply module, to provide power to the aerostat magnetism measurement portion;
(2) connecting the onboard laboratory magnetism measurement portion, and placing an antenna portion of the laboratory transmission unit at an open position on the top of the surveying ship 11;
(3) online testing the aerostat magnetism measurement portion and the onboard laboratory magnetism measurement portion to ensure that the overall operation is normal, that a wireless data link between the aerostat magnetism measurement portion and the onboard laboratory magnetism measurement portion is normal, that the command setting and feedback is normal, and that the activation and acquisition of the magnetometer is normal;
(4) allowing the surveying ship 11 to travel at a low speed, releasing the aerostat shell 12, and firmly connecting the aerostat shell 12 to the surveying ship 11 via a KEVLAR® rope 13, wherein, the KEVLAR® rope 13 between the aerostat shell 12 and the surveying ship 11 should be long enough to at least ensure that the distance from the aerostat magnetism measurement portion to the surveying ship 11 is not less than three times of the length of the ship body of the surveying ship 11 in order to avoid the interference from the magnetic field of the ship body;

(6) online testing again, specifically including but not limited to: ensuring the wireless data link between the aerostat magnetism measurement portion and the onboard laboratory magnetism measurement portion to be normal, ensuring the command setting and feedback to be normal, ensuring the activation and acquisition of the magnetometer to be normal, and carefully observing the jitter of the acquired magnetism data, wherein the jitter should not exceed 0.5 nT (nano Tesla);

(7) accelerating the surveying ship 11 to a normal speed (e.g., a speed of 10 kn (Knots)), and starting the measurement of marine magnetism; acquiring, by the total-field magnetic sensor and in the travelling process, marine magnetism and transmitting a marine magnetism signal to the electronic magnetism data acquisition unit; converting, by the electronic magnetism data acquisition unit, the marine magnetism signal into a digital signal and transmitting the digital signal to the aerostat transmission unit; transmitting, by the aerostat transmission unit, the digital signal to the laboratory transmission unit over a Wi-Fi network, and transmitting a command, which is transmitted by the laboratory transmission unit and issued by the data recording computer, to the electronic magnetism data acquisition unit; transmitting, by the laboratory transmission unit, the digital signal to the data recording computer, and transmitting a command issued by the data recording computer to the aerostat transmission unit over a Wi-Fi network; and, receiving, by the data recording computer, the data transmitted from the electronic magnetism data acquisition unit, recording, processing and monitoring the data to obtain marine magnetism data, and storing the marine magnetism data into the data recording computer in real time;

(8) before the exhaustion of the battery power, decreasing the speed of the surveying ship 11, withdrawing the aerostat shell 12 to the deck of the surveying ship 11, replacing the battery of the aerostat magnetism measurement portion, and repeating the steps (3) to (7); and (9) after all the marine magnetism measurement operations are completed, decreasing the speed of the surveying ship 11, and withdrawing the aerostat shell 12 to the deck of the surveying ship 11.

Figure 3:
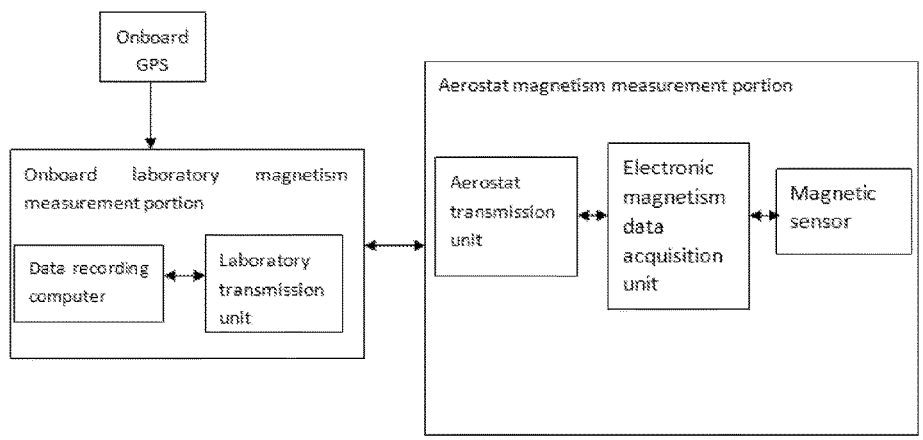
FIG. 3 is a modular schematic block diagram of an Embodiment 2 of the marine magnetism detection device consistent with FIG. 1.

As shown in FIG. 3, in Embodiment 2 of the marine magnetism detection device of the present invention, differences from Embodiment 1 include: the aerostat magnetism measurement portion is connected to the onboard laboratory magnetism measurement portion via a wired cable; the signal transmission between the aerostat transmission unit and the laboratory transmission unit is realized over a wired network; the aerostat magnetism measurement portion does not need a power supply module; and, the onboard laboratory magnetism measurement portion provides power to the aerostat magnetism measurement portion via a wired cable which is enveloped inside the rope 13.

Figure 4:
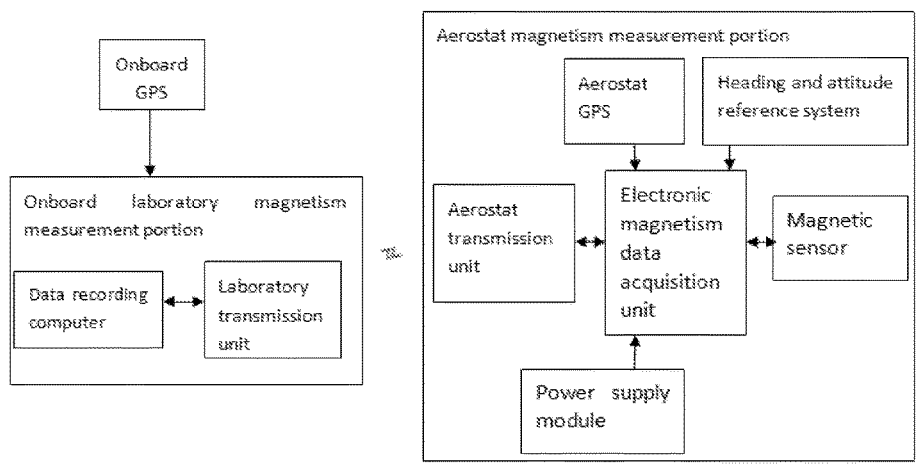
FIG. 4 is a modular schematic block diagram of an Embodiment 3 of the marine magnetism detection device consistent with FIG. 1.

As shown in FIG. 4, in Embodiment 3 of the marine magnetism detection device of the present invention, differences from Embodiment 1 include: as the magnetic sensor, a single vector-type magnetic sensor is used; the aerostat magnetism measurement portion further includes a heading and attitude reference system and an aerostat GPS; the heading and attitude reference system is configured to measure the heading, roll angle and pitch angle parameters of the aerostat shell 12 and transmit the measured parameters to the electronic magnetism data acquisition unit; and, the aerostat GPS is configured to provide aerostat position information and perform high-precision timing on the aerostat magnetism measurement portion.

Differences between the marine magnetism detection method in this Embodiment 3 and the detection method in Embodiment 1 include: in the step (7), the surveying ship 11 is accelerated to a normal speed (e.g., a speed of 10 kn), and the measurement of marine magnetism starts; during the measurement, the electronic magnetism data acquisition unit synchronously acquires magnetism data and attitude data acquired by the heading and attitude reference system, wherein an acquisition error of 1 second between both these elements will result in a large magnetism measurement error, so that an aerostat CPS timing pulse is used as a reference signal for triggering acquisition in order to ensure the synchronization precision of the magnetism data and the attitude data.

Figure 5:
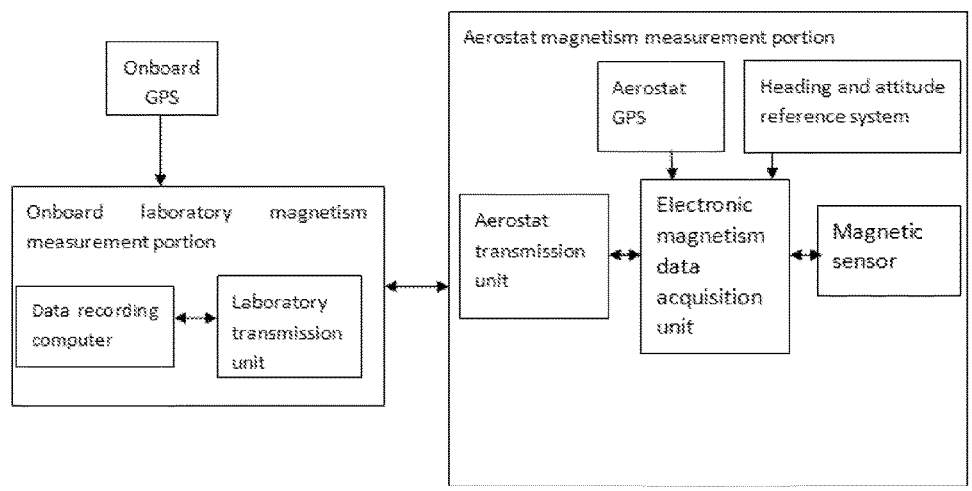
FIG. 5 is a modular schematic block diagram of an Embodiment 4 of the marine magnetism detection device consistent with FIG. 1.

As shown in FIG. 5, in Embodiment 4 of the marine magnetism detection device of the present invention, differences from Embodiment 3 include: the aerostat magnetism measurement portion is connected to the onboard laboratory magnetism measurement portion via a wired optical fiber; the signal transmission between the aerostat transmission unit and the laboratory transmission unit is realized over a wired network; the aerostat magnetism measurement portion does not need a power supply module; and, the onboard laboratory magnetism measurement portion provides power to the aerostat magnetism measurement portion via a wired optical fiber which is enveloped inside the rope 13.

In addition, as the magnetic sensor, a plurality of total-field magnetic sensors or a plurality of vector-type magnetic sensors may also be used. The total-field magnetic sensors may be Overhauser magnetic sensor, proton-precession magnetic sensor, optical-pump magnetic sensors or the like. The vector-type magnetic sensors may be fluxgate-type magnetic sensor or other types of magnetic sensors. The vector-type magnetic sensors are used for measuring three components X, Y and Z of a geomagnetic field.

The aerostat magnetism measurement portion further includes peripheral sensors. The peripheral sensors include one or more of cameras, altitude meters, temperature sensors and inclination sensors. The peripheral sensors are each connected to the electronic magnetism data acquisition unit. An onboard GPS is connected to the surveying ship 11.

The foregoing description merely shows specific implementations of the present invention, and the protection scope of the present invention is not limited thereto. Any changes or replacements obtained without paying any creative labor shall fall into the protection scope of the present invention.

INDUSTRIAL APPLICABILITY

The marine magnetism detection method and device of the present invention will not be limited by the working sea area in the practical marine magnetism detection process and can also operate with other onboard devices and dragging devices, so that the marine magnetism detection method and device of the present invention are more convenient to operate and are industrially applicable.

What is claimed is:

1. A marine magnetism detection device, comprising:
a surveying ship,
an onboard laboratory magnetism measurement portion arranged on the surveying ship,
an aerostat shell and an aerostat magnetism measurement portion arranged inside the aerostat shell, wherein the aerostat shell is connected to the surveying ship via a rope, and the aerostat shell floats in air;

the aerostat magnetism measurement portion comprises a magnetic sensor, an electronic magnetism data acquisition unit and an aerostat transmission unit;

the onboard laboratory magnetism measurement portion comprises a data recording computer and a laboratory transmission unit;

the magnetic sensor acquires marine magnetism and transmits a marine magnetism signal to the electronic magnetism data acquisition unit;

the electronic magnetism data acquisition unit converts the marine magnetism signal into a digital signal and then transmits the digital signal to the aerostat transmission unit;

the aerostat transmission unit transmits the digital signal to the laboratory transmission unit over a wireless or wired network and transmits a command, which is transmitted by the laboratory transmission unit and issued by the data recording computer, to the electronic magnetism data acquisition unit; and the laboratory transmission unit transmits the digital signal to the data recording computer and transmits a command issued by the data recording computer to the aerostat transmission unit over a wired or wireless network.

2. The marine magnetism detection device according to claim 1, wherein the magnetic sensor is a total-field magnetic sensor.

3. The marine magnetism detection device according to claim 1, wherein the magnetic sensor is a vector-type magnetic sensor; the aerostat magnetism measurement portion further comprises a heading and attitude reference system; and, the heading and attitude reference system is configured to measure heading, roll angle and pitch angle parameters of the aerostat shell and transmit the measured parameters to the electronic magnetism data acquisition unit.

4. The marine magnetism detection device according to claim 1, wherein the rope is made of aramid fiber material.

5. The marine magnetism detection device according to claim 1, wherein data transmission between the laboratory transmission unit and the aerostat transmission unit is realized by a cable or an optical fiber, and the cable or optical fiber is enveloped inside the rope.

6. The marine magnetism detection device according to claim 1, wherein data transmission between the laboratory transmission unit and the aerostat transmission unit is realized via Wi-Fi.

7. The marine magnetism detection device according to claim 1, wherein a power supply module is provided within the aerostat shell, and the power supply module provides power to the aerostat magnetism measurement portion.

8. The marine magnetism detection device according to claim 1, wherein the aerostat magnetism measurement portion further comprises peripheral sensors; the peripheral sensors comprise cameras and/or altitude meters and/or temperature sensors and/or inclination sensors; and, the peripheral sensors are each connected to the electronic magnetism data acquisition unit.

9. The marine magnetism detection device according to claim 1, wherein the aerostat magnetism measurement portion further comprises an aerostat GPS connected to the electronic magnetism data acquisition unit.

10. The marine magnetism detection device according to claim 1, wherein an onboard GPS is connected to the surveying ship.

11. A marine magnetism detection method, comprising:
providing a marine detection device in accordance with claim 1;
connecting all portions of the marine magnetism detection device to ensure the portions to operate normally;
allowing the surveying ship to travel at a low speed, and releasing the aerostat shell so that the aerostat shell floats in air;
testing the marine magnetism detection device to ensure all portions to operate normally; and
allowing the surveying ship to travel at a normal speed; acquiring, by the magnetic sensor and during a travelling process, marine magnetism and transmitting a marine magnetism signal to the electronic magnetism data acquisition unit; converting, by the electronic magnetism data acquisition unit, the marine magnetism signal into a digital signal and transmitting the digital signal to the aerostat transmission unit; transmitting, by the aerostat transmission unit, the digital signal to the laboratory transmission unit over a wireless or wired network, and transmitting a command, which is transmitted by the laboratory transmission unit and issued by the data recording computer, to the electronic magnetism data acquisition unit; transmitting, by the laboratory transmission unit, the digital signal to the data recording computer, and transmitting a command issued by the data recording computer to the aerostat transmission unit over a wired or wireless network; and, receiving, by the data recording computer, the data transmitted from the electronic magnetism data acquisition unit, and recording, processing and monitoring the data to obtain marine magnetism data.

12. The marine magnetism detection method according to claim 11, wherein a distance from the surveying ship to the aerostat shell is not less than a length of a ship body of the surveying ship.

13. The marine magnetism detection method according to claim 12, wherein the electronic magnetism data acquisition unit synchronously acquires magnetism data and attitude data acquired by the heading and attitude reference system; and the electronic magnetism data acquisition unit synchronously transmits the magnetism data and the attitude data to the aerostat transmission unit.

* * * * *